United States Patent [19]

Wilkin

[11] 3,718,061
[45] Feb. 27, 1973

[54] STOP GAGE FOR BAND SAW CONVEYOR OR THE LIKE
[75] Inventor: John P. Wilkin, Schaumburg, Ill.
[73] Assignee: Armstrong-Blum Manufacturing Company, Chicago, Ill.
[22] Filed: June 29, 1970
[21] Appl. No.: 50,532

[52] U.S. Cl. ..................83/201, 83/268, 83/419, 83/467 A, 83/468
[51] Int. Cl. ..............................................B26d 7/16
[58] Field of Search....83/419, 468, 467 A, 467, 201, 83/268, 269, 522, 201.07; 269/320, 317, 318

[56] References Cited

UNITED STATES PATENTS

| | | | |
|---|---|---|---|
| 3,244,047 | 5/1966 | Daniluk | 83/269 |
| 3,245,299 | 4/1966 | Klusmier et al. | 83/269 |
| 3,457,817 | 7/1969 | Turnbull et al. | 83/522 |
| 3,552,254 | 1/1971 | Marczy | 83/522 X |
| 3,474,693 | 10/1969 | Wilkie et al. | 83/201.07 |
| 3,141,367 | 7/1964 | Keener et al. | 83/268 X |
| 3,155,242 | 11/1964 | Magloire | 83/269 X |
| 3,304,824 | 2/1967 | Hess, Sr. et al. | 83/269 X |

Primary Examiner—James M. Meister
Attorney—Wolfe, Hubbard, Leydig, Voit and Osann

[57] ABSTRACT

A dead stop for positioning stock on the conveyor of a band saw to establish a desired cut off length. The stop member is mounted on a carriage which rides along a rail adjacent the conveyor on the downstream side and which may be clamped to the rail at a desired point. The stop member is hinged for upward swinging movement with provision for relative retreating movement along the hinge axis. A cam and cam follower are interposed between the stop member and the carriage with a fluid actuator for retracting and swinging up the stop member to permit a severed work piece to be transported along the conveyor for discharge. Upon impact the stop member retreats against the force applied by the actuator followed by prompt restoration to a reference position. The movement of the carriage and the clamping to the rail as well as the swinging of the stop member are all controlled from a control station at the band saw where the position of the stop member is accurately and continuously indicated on a calibrated tape which is subject to continuous tensioning and take-up by a negator spring.

8 Claims, 20 Drawing Figures

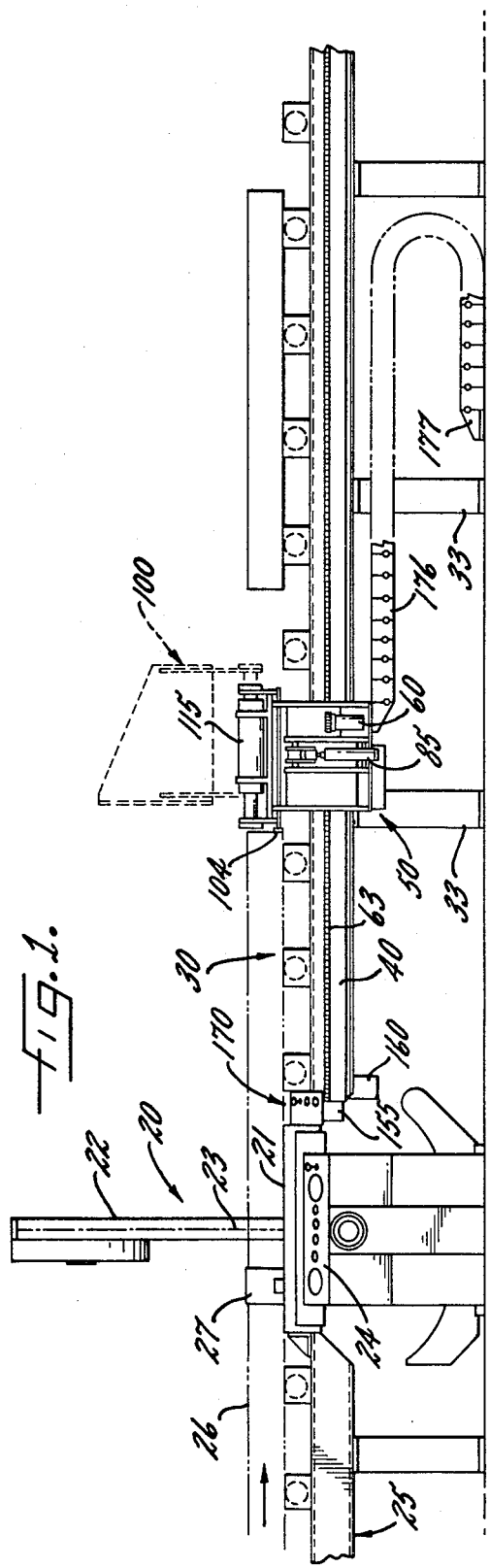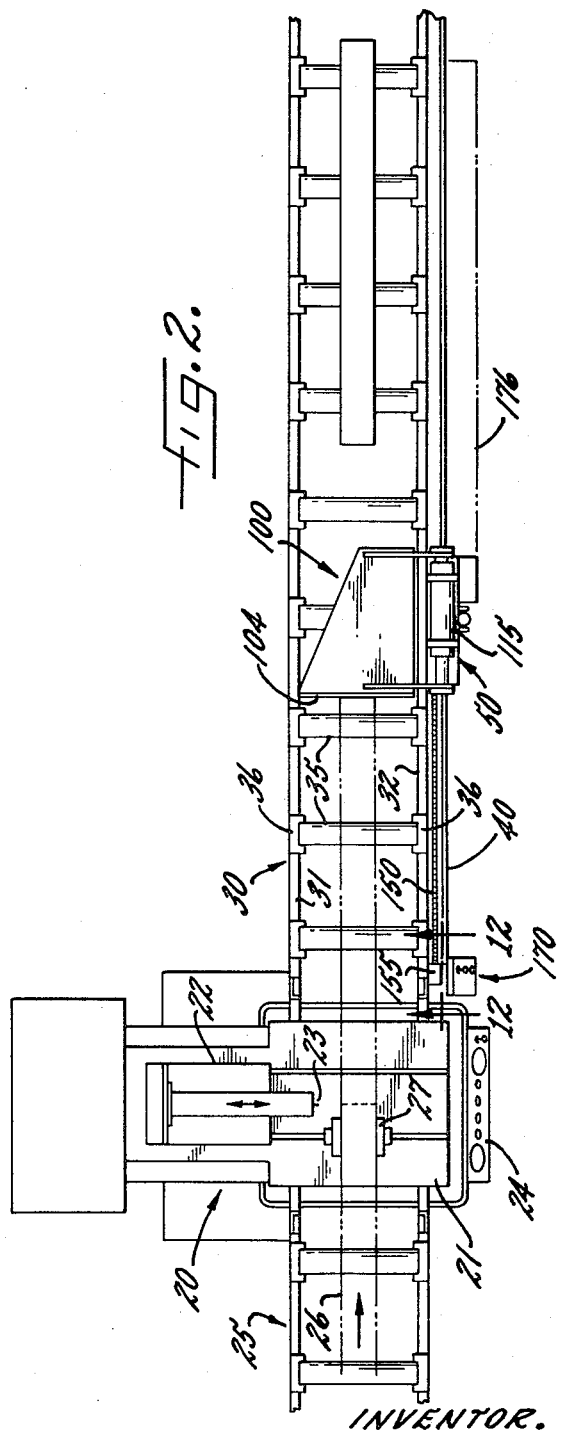

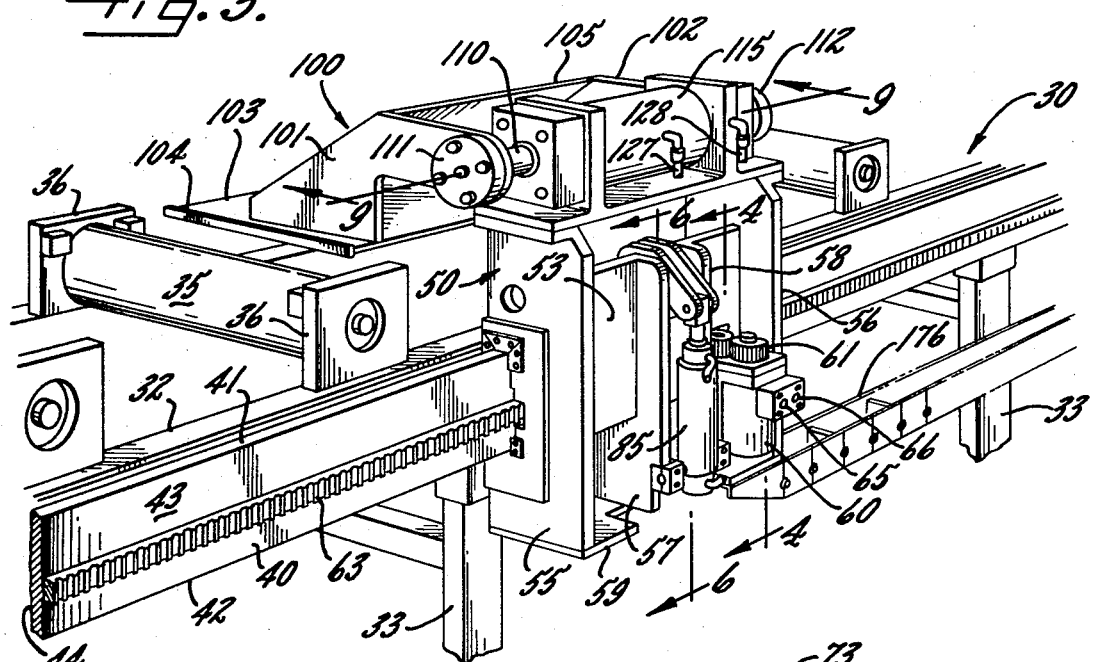
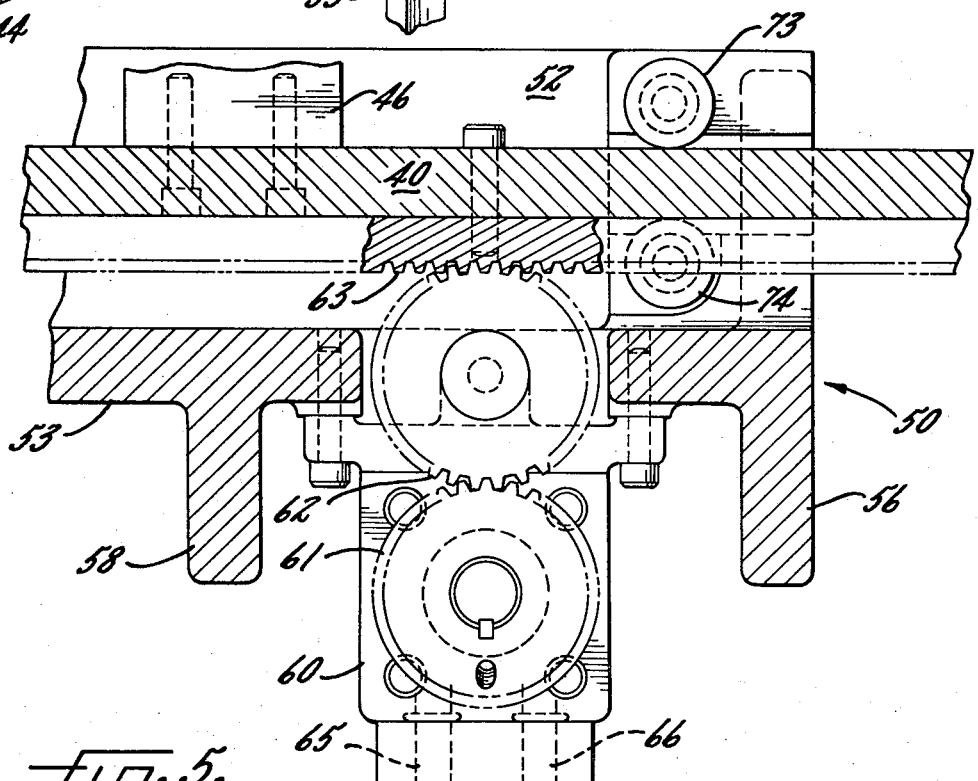

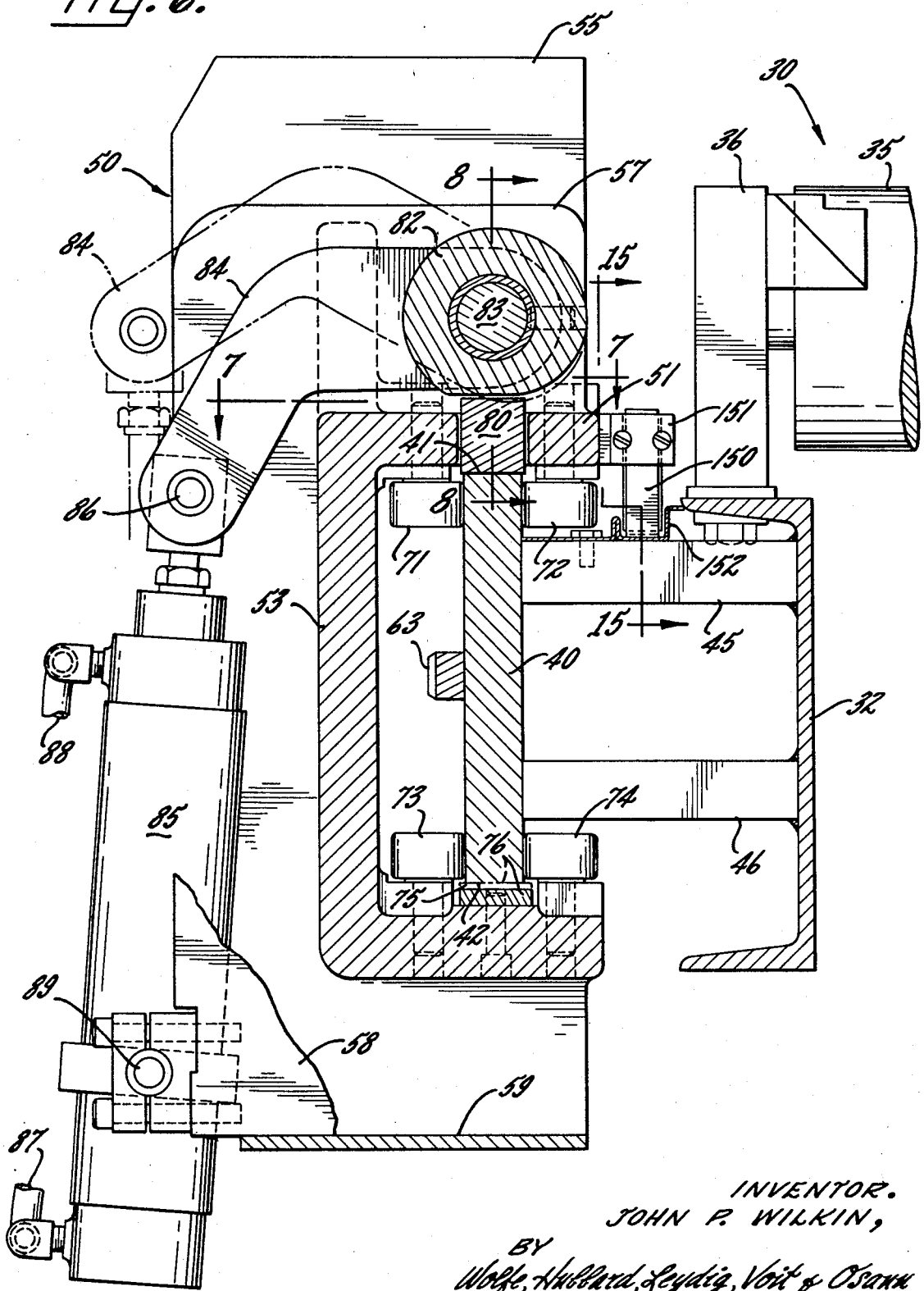

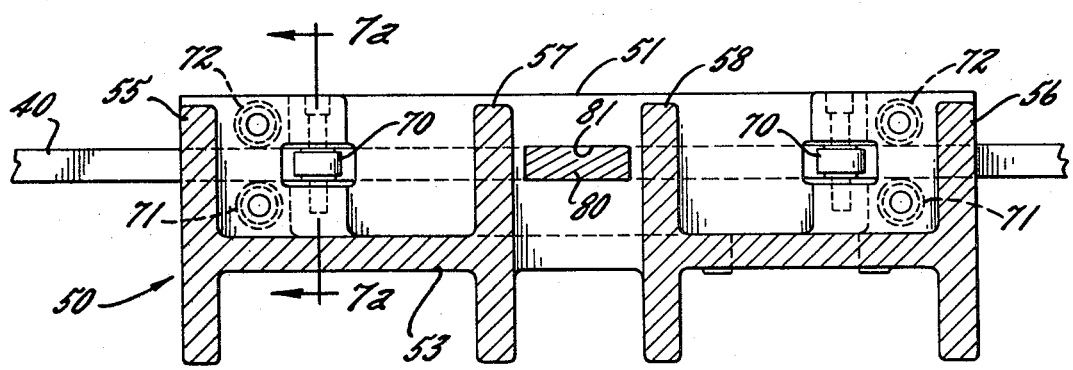
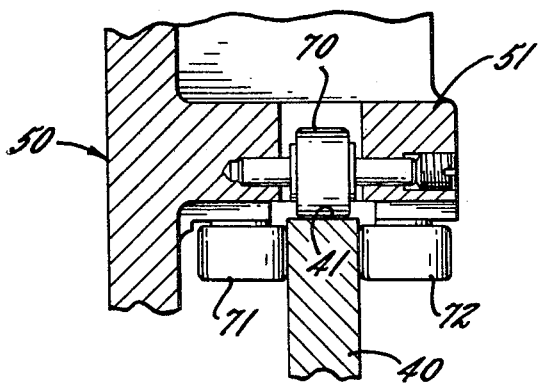
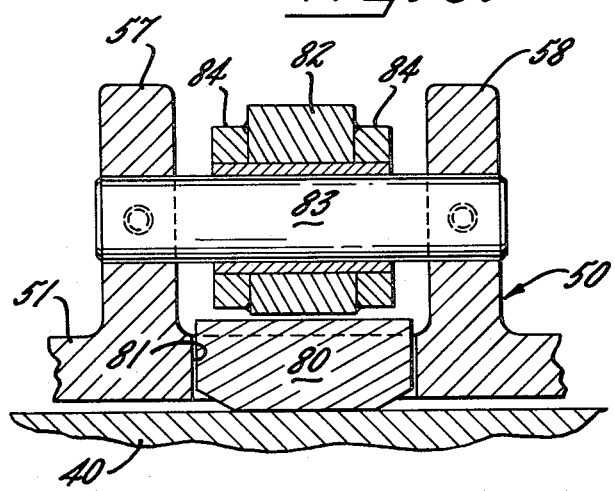

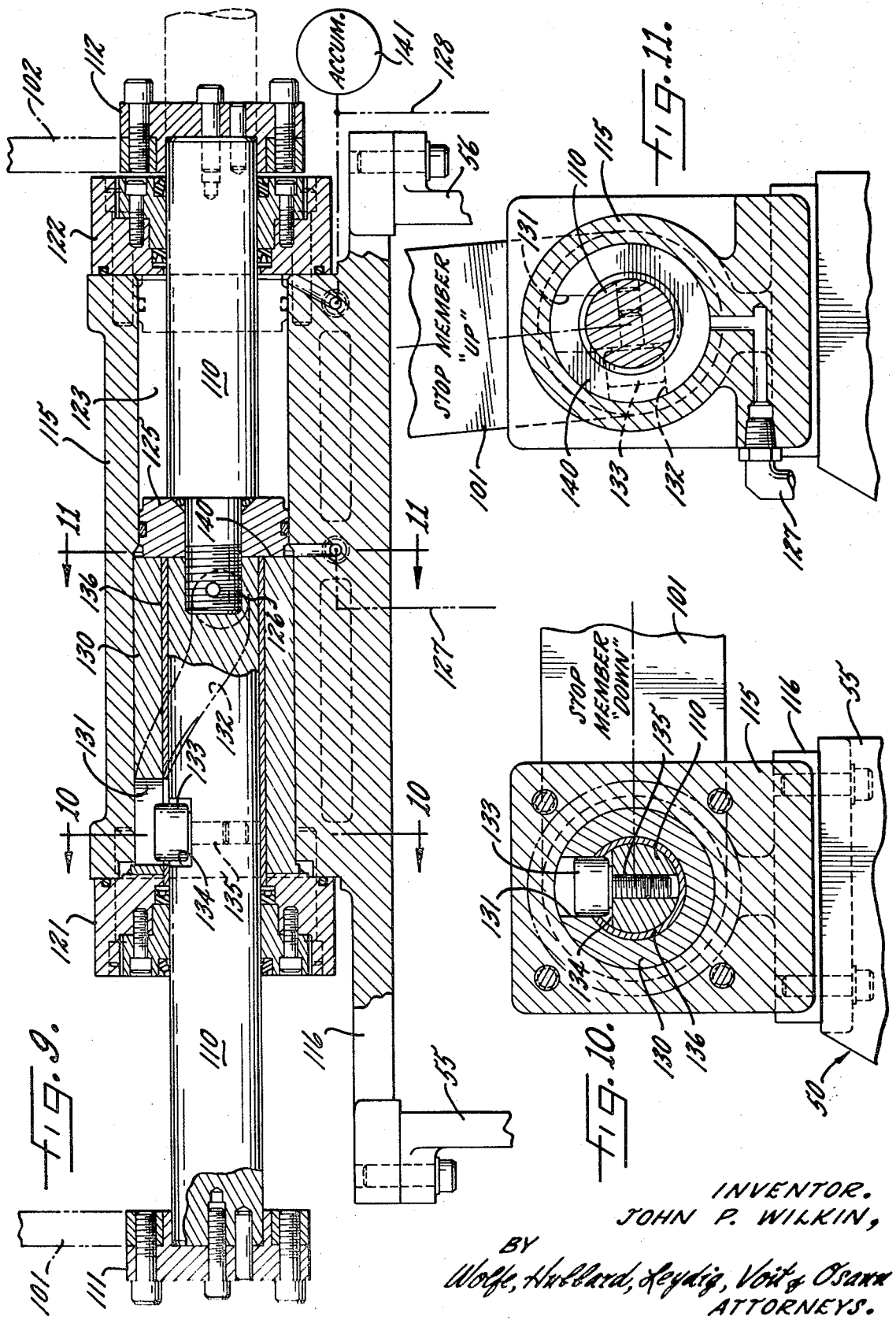

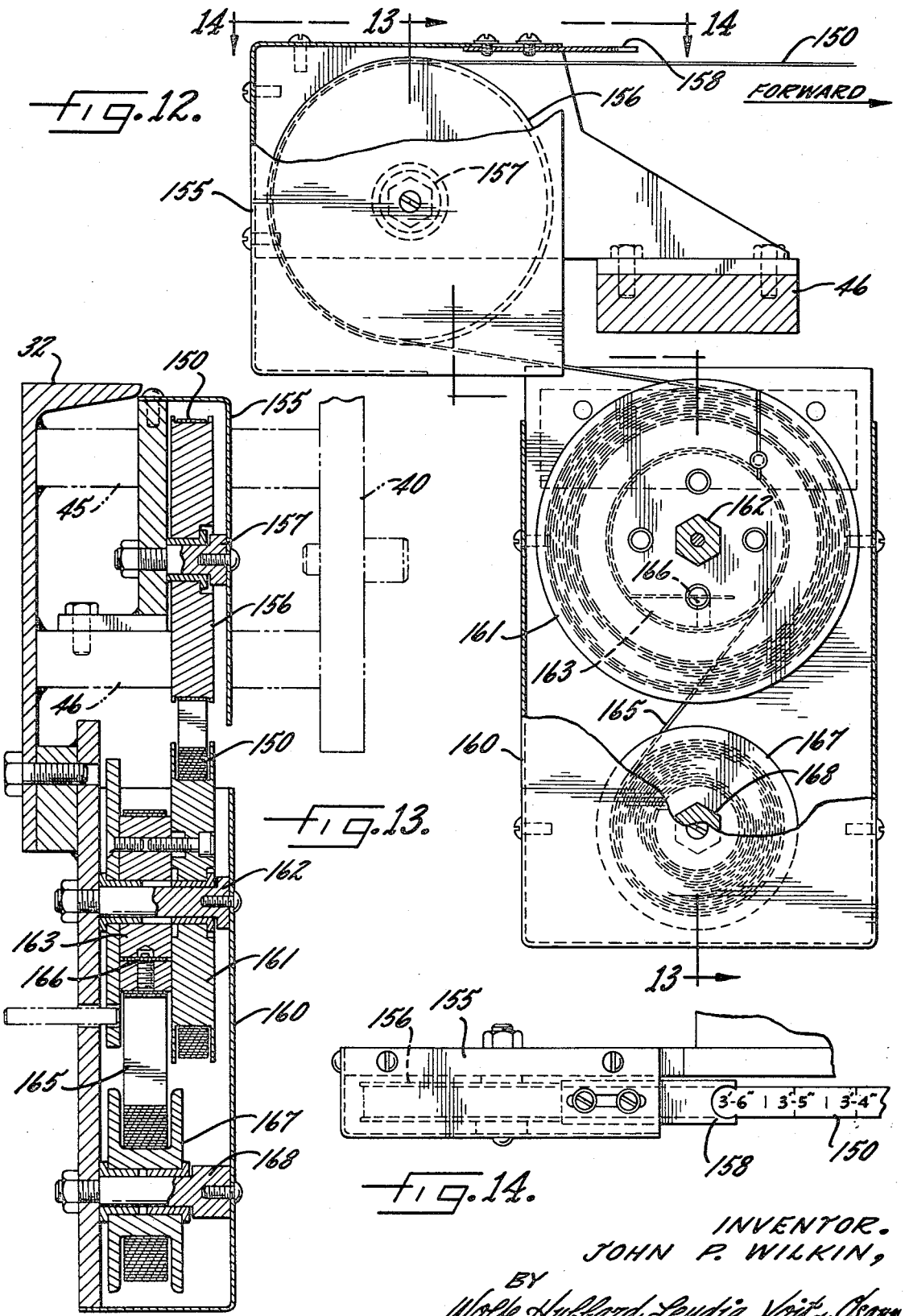

INVENTOR.
JOHN P. WILKIN,
BY
Wolfe, Hubbard, Leydig, Voit & Osann
ATTORNEYS.

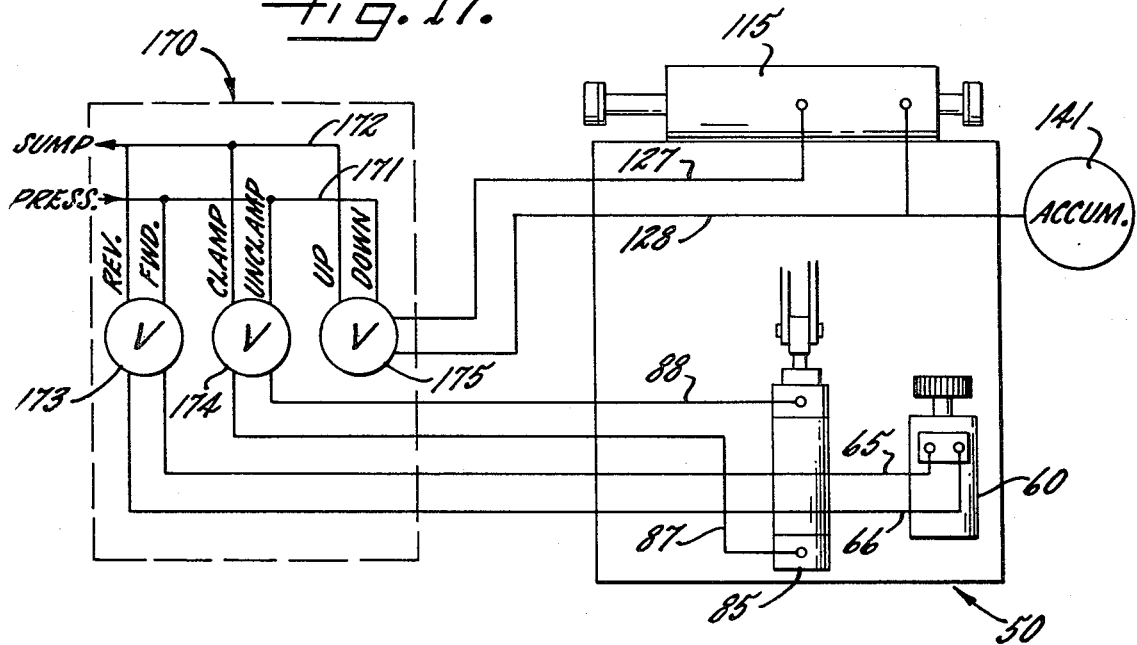

STOP GAGE FOR BAND SAW CONVEYOR OR THE LIKE

It is an object of the present invention to provide a dead stop which is positive and precise, which enables accurate cut-off of a series of workpieces of the same or different length from a length of stock, and in which all functions are conveniently controllable from a control station at the band saw. It is a more specific object to provide a dead stop which is remotely positionable, which is securely clamped in locking position and which permits prompt swinging into an out of the way position for continued movement of the severed workpiece along the conveyor, all by means of fingertip manipulation of the controls and with constant and accurate indication of the cut-off length for which the device has been set.

It is another object of the present invention to provide a dead stop which is capable of intercepting and positioning heavy stock, which has provision for momentary retreating movement to absorb the energy of impact followed by immediate restoration to reference position, and which has a novel design of cam and actuator interposed between the carriage and the stop member to bring about sequential retraction and swinging movement for prompt freeing of the severed work piece and prompt lowering thereafter into blocking position to minimize the time lost between successive cuts.

In one of the aspects of the invention it is an object to provide constant and positive indication, at the control station, of the cut-off length for which the stop is set with continuous tensioning take up regardless of whether the carriage is mounted on the "near" or "far" side of the conveyor.

Other objects and advantages of the invention will become apparent upon reading the attached detailed description and upon reference to the drawings:

FIG. 1 is a view in elevation of a band saw and conveyor assembly incorporating a dead stop constructed in accordance with the present invention.

FIG. 2 is a plan view corresponding to FIG. 1.

FIG. 3 is a perspective view of the dead stop carriage and stop member.

FIG. 5 is a fragmentary horizontal section looking along the line 5—5 in FIG. 4.

FIG. 6 is a fragmentary vertical section taken along the line 6—6 in FIG. 3 and offset from the section 4—4.

FIG. 7 is a horizontal section taken along the line 7—7 in FIG. 6.

FIG. 7a is a fragmentary section taken along the line 7a—7a in FIG. 7.

FIG. 8 is a fragmentary section taken along the line 8—8 in FIG. 6.

FIG. 9 is a fragmentary horizontal section taken through the actuator along line 9—9 in FIG. 3.

FIGS. 10 and 11 are fragmentary cross sections taken along the lines 10—10 and 11—11 respectively in FIG. 9

FIG. 12 is an enlarged side elevation of the tape cartridge and take up means looking along the line 12—12 in FIG. 2 and with the housing partially broken away.

FIG. 13 is a broken vertical section taken along the line 13—13 in FIG. 12.

FIG. 14 is a top view looking along the line 14—14 in FIG. 12.

Figure 4:
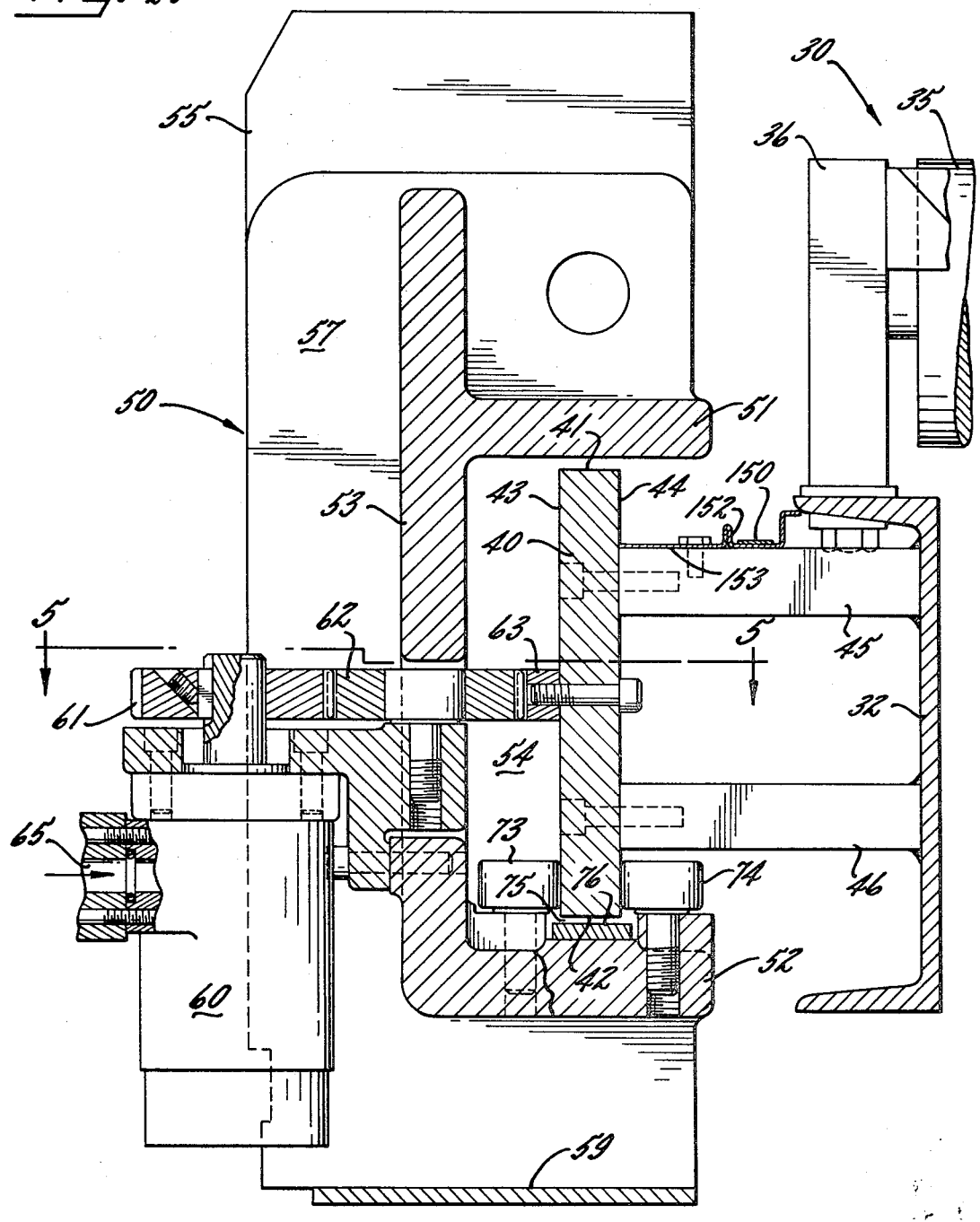
FIG. 4 is a fragmentary vertical section taken along the line 4—4 in FIG. 3.
Figure 15:
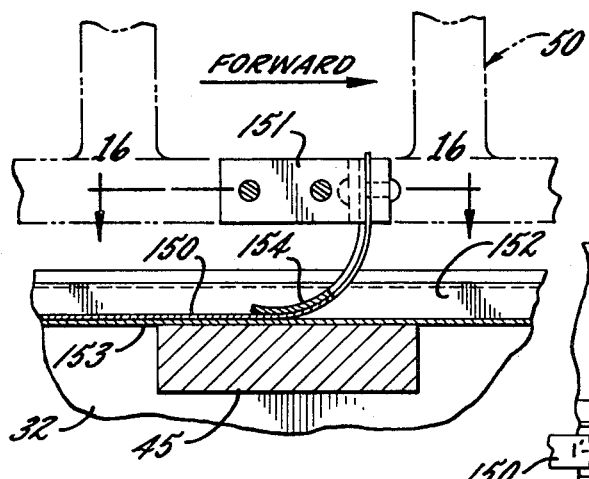

FIG. 15 is fragmentary elevation showing the connection of the calibrated tape to the carriage.

Figure 16:
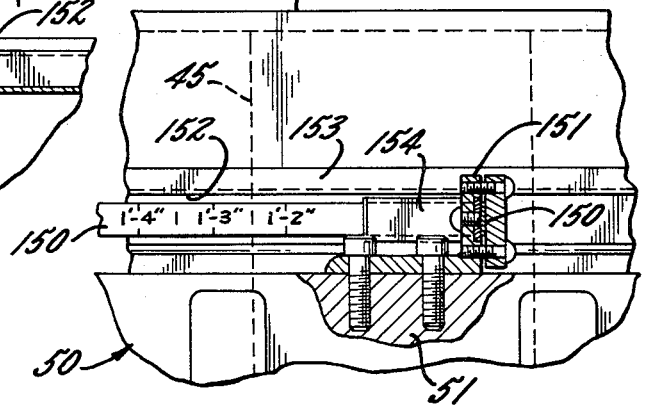

FIG. 16 is a fragmentary section looking along the line 16—16 in FIG. 15.

FIG. 17 is a simplified control diagram showing the control valves at the control station and with the connecting lines indicated schematically.

Figure 18:
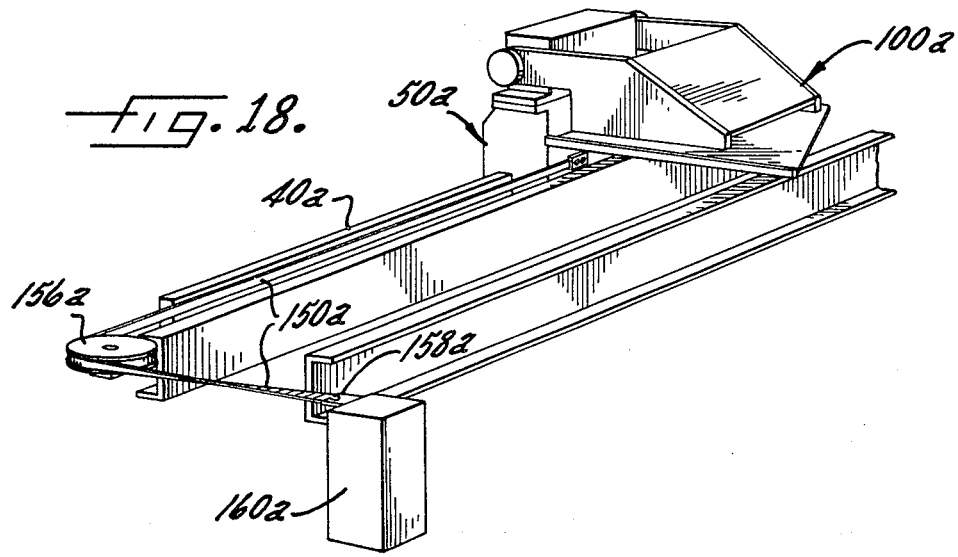

FIG. 18 is a fragmentary perspective showing the run of tape to the control station employed when the carriage is on the opposite side of the conveyor.

FIG. 19 is a schematic diagram showing means for automatic positioning of the carriage.

While the invention has been described in connection with a preferred embodiment, it will be understood that I do not intend to be limited to the particular embodiment shown but intend, on the contrary, to cover the various alternative and equivalent constructions included in the spirit and scope of the appended claims.

Turning now to the drawings, a typical production installation is shown in FIGS. 1 and 2 including a band saw 20 having a fixed table 21 and a forwardly and backwardly reciprocating frame 22 carrying a saw blade 23, the blade being oriented in the direction of movement of the frame. The means for driving the saw and reciprocating the frame on which it is mounted do not per se form a part of the present invention, and it will suffice to say that such functions are controlled in the conventional way from a control panel 24 at the front of the machine.

Leading into the saw table from the left hand side is an inlet conveyor 25 carrying a lengthy piece of stock 26 which is to be cut into predetermined shorter length. The stock passes between the jaws of a vise 27 mounted on the table 21. At the right hand, or downstream, side of the saw is a conveyor 30 having longitudinal frame elements 31,32 and supporting structure 33. Spaced along the top surface of the conveyor are conveying rollers 35 journaled in supports 36. Conventional means are provided for driving all of the conveyor rollers at the same speed for transport of the stock into position to make a cut and for thereafter transporting the severed workpiece along the conveyor to an ejecting station.

In accordance with the present invention a dead stop is provided on the conveyor at the downstream side of the saw consisting of a stop member which extends transversely of the conveyor in the path of movement of the stock and a supporting carriage which is mounted on a longitudinally extending rail, with means for positively clamping the carriage to the rail for precise positioning of the stop member. Further in accordance with the invention, the stop member mounted for upward swinging movement about a hinge axis with provision for a limited amount of axial movement and with a combined actuator and cam assembly for sequential axial retraction and upward swinging out of the path of the severed workpiece for continued movement of the latter along the conveyor to the point of discharge.

Thus, referring to FIGS. 1-6, a rail 40 extends along the side of the conveyor, the rail being in the form of a relatively massive strip of metal having upper and lower parallel edges 41,42 and front and rear faces 43, 44. The rear face 44 is firmly secured to the side frame 32 of the conveyor on stand-offs 45, 46. Riding on the rail 40 is a carriage 50 which is centrally recessed to provide upper and lower arms 51, 52 which embrace the upper and lower edges of the rail and a wall 53 in C configuration (FIG. 4) defining a central space 54 in which the rail is received. The carriage is reinforced by integral end members 55, 56, arranged vertically and parallel to one another and by intervening rib members 57, 58. The bottom of the carriage is enclosed by a bottom plate 59.

For the purpose of driving the carriage along the rail, the carriage includes a self-contained hydraulic motor 60 having a pinion 61 and an idler gear 62 (see FIGS. 4 and 5), the idler gear meshing with a rack 63 which is secured to the front face 43 of the rail. The hydraulic motor is of conventional design having supply orifices 65, 66 which are alternatively pressurized to drive the motor in one direction or the other. As discussed in a later paragraph, the motor and the other controllable elements in the carriage are remotely operated from a control station located at the band saw.

Anti-friction means are provided for supporting the carriage on the rail as it is moved along. Such anti-friction means includes load rollers 70 (see FIGS. 7 and 7a) which engage the top edge of the rail, a first set of lateral rollers 71, 72 which engage the side faces of the rail adjacent to the upper edge and a second set of rollers 73, 74 which engage the side faces along the bottom edge. Such suspension provides a limited amount of clearance 75, during transport, along the bottom edge of the rail adjacent a fixed shoe 76.

For clamping the carriage to the rail, a shiftable shoe is provided which is loosely received in the upper arm 51 and which has means for crowding it downwardly against the rail for relatively upward lifting movement of the carriage to take up the clearance space 75 at the lower edge of the rail so that the rail is powerfully clamped top and bottom. Thus, referring to FIGS. 6 and 8, a shoe 80 loosely fitted in an opening 81 in the top arm is acted upon by a cam 82. The cam is mounted for rotation about a shaft 83 which extends between the internal ribs 57, 58 of the carriage. For rocking the cam about the shaft in opposite directions with a high mechanical advantage, the cam is provided with a pair of arms 84 which are connected to a reversible fluid actuator 85 by means of a pin connection 86. The actuator has fluid connections 87, 88 which may be alternatively pressurized by remote control. When the connection 87 is pressurized, extension of the actuator causes clockwise rotation of the cam 82 which crowds downwardly against the shoe 80. For the purpose of accommodating the slight rocking movement which occurs incident to the swing of the arms 84, the actuator is mounted on a swivel 89. Pressurizing the connection 88 contracts the actuator to relieve the force against the shoe 80, permitting the carriage to settle and reestablishing clearance at the bottom edge of the rail for free movement of the carriage to a new position.

In accordance with the present invention, a stop member in the form of an arm is provided, hinged to the carriage, and having a presented stop surface which extends the width of the conveyor, the hinge not only permitting upward swinging movement but also movement endwise of the hinge axis. Referring to FIG. 3 the stop member, generally indicated at 100 has spaced arms 101, 102, secured by welding or equivalent to a stop plate 103 having a stop surface 104 along the presented edge. A reinforcing plate 105 bridges the arms 101, 102 to provide a rigid box-like construction. The arms are secured to the ends of a shaft 110, extending parallel to the rail, by rigid bolted connections 111, 112 respectively. The shaft is mounted for swinging movement, and axial movement, in a sleeve 115 having a base 116 which is secured to pads provided at the top of the carriage side members 55, 56.

In carrying out the present invention, the sleeve 115 includes an integral reversible pressure actuator for imparting endwise movement to the shaft 110 as well as internal cam track which engages a cam follower on the shaft, the cam track having an initial, axially extending portion, so that the stop member is first retracted away from the severed workpiece, and an angled or helical portion for rocking the shaft so that the stop member is swung upwardly out of the way of the workpiece for continued movement of the workpiece to the point of discharge from the conveyor. Thus referring to FIG. 9, the sleeve 115 which mounts the shaft has combined sealing and bearing assemblies 121, 122 at the ends and is centrally recessed to form an annular chamber 123. Secured to the shaft 110, and movable within the chamber 123 is a piston 125. To facilitate mounting of the piston on the shaft, the shaft may be formed in two pieces joined by a threaded, pinned connection 126. Providing communication with the opposite ends of the annular chamber 123 are fluid pressure connections 127, 128. It will be apparent that pressurizing the connection 127 will cause the piston 125 and the shaft 110 to move in the "retracting" direction, that is, to the right as viewed in FIG. 9.

The cam track and cam follower, which are effectively interposed between the stop member and the carriage, are incorporated in the lefthand portion of the supporting sleeve 115. As shown in FIG. 9 the sleeve includes an annular insert 130 which is milled out to form a cam track made up of an initial axially extending section 131 and an angled, or helical, section 132. Snugly fitted into this cam track is a cam follower in the form of a roller 133, which is slightly recessed into a cavity 134 formed in the shaft, and which is secured to the shaft by a mounting screw 135. For providing a smooth and snug fit between the shaft and the annular insert 130, a sleeve 136 made of bronze or suitable anti friction bearing material may be interposed between the two.

In order to establish a reference position for the shaft 110, and hence for the stop surface 104 which engages the stock, an axially positioned reference stop is provided within the assembly. This reference stop, indicated at 140 in FIG. 9, is the surface at the end of the insert 130 against which the piston 125 seats when the piston is urged fully in the direction of the oncoming stock by fluid pressure applied to the inlet 128. Thus under normal conditions, with the stop surface 104 in position to receive the oncoming stock, the parts are as shown in FIG. 9.

It is one of the features of the present invention that when the oncoming end of a length of stock strikes the stop surface 104, the stop member 100, and the shaft 110, are free to yield to take up the impact, with absorption of the kinetic energy in the stock. Such yielding, with subsequent restoration to reference position, is facilitated by use of an accumulator 141 of known design connected to the orifice 128. When impact occurs the cam follower 133 on the shaft retreats in the straight section 131 of the cam track accompanied by movement of the piston 125 into the space 123 displacing the oil or other fluid into the accumulator 141. The energy is dissipated in the sudden and turbulent flow of the fluid and by a momentary increase of pressure in the accumulator. Immediately after the impact the pressure in the accumulator and that of the pump re-asserts itself to cause movement of the piston to the left until bottoming takes place at the reference stop 140, thereby positioning the stock which is in engagement with the surface 104 in a precise position for cut-off.

As the forward cutting stroke of the band saw frame is completed, the pressure applied to the piston 125 is reversed, that is, pressure fluid is applied to the conduit 127 by a suitable valve, conduit 128 being connected to a sump. This causes the shaft to move straight back, retracting the stop surface 104 from the engaged end of the work piece as the cam follower 133 traverses the initial straight portion of the track, followed by upward swinging movement of the stop member 100 as the cam follower engages the helical portion 132 of the track, until the piston bottoms at the opposite end of the stroke, with the stop member completely clear of the work piece. The conveyor is then operated to convey the severed workpiece as quickly as possible to a point beyond the dead stop for lateral discharge, for example, by an ejector bar which sweeps broadwise across the conveyor as covered in my copending application Ser. No. 50,706, filed June 29, 1970 now U.S. Pat. No. 3,655,025 issued Apr. 11, 1972. After this the pressure applied to the conduits is again reversed, promptly lowering the stop member 100 into the path of movement of the oncoming stock in readiness for the next cut-off cycle. Because the cam follower 133 on the shaft is confined within the cam track, the lowering of the stop member occurs, although promptly, in a positive and controlled fashion until the piston seats on the reference surface 140.

In accordance with one of the aspects of the invention, a calibrated tape connected to the carriage leads to the control station at the bandsaw for direct indication of the distance between the stop surface 104 and the saw blade, with means for maintaining the tape under constant tensioned take-up. Thus, referring to FIGS. 12–16, the tape, indicated at 150, is anchored to the carriage by a bracket 151 (FIG. 15) and is supported in a shallow longitudinally extending trough 152 (FIG. 6) formed in a thin metal bridge or apron 153 which spans the space between the rail 40 and the adjacent frame member 32 of the conveyor. The tape is guided from its anchoring bracket 151 into the trough at its remote, or moving, end by a curved spoon 154 which is integral with the bracket.

At the control station the tape 150 passes into a housing 155 (FIG. 12) which contains an idler 156 mounted on a shaft 157. Arranged above the tape is an index 158 which permits direct reading of the tape calibrations. From the idler 156 the tape passes into a reservoir housing 160 having a reservoir or take-up reel 161 mounted on a shaft 162 and having a hub 163. Wound about the hub is a negator spring 165. The spring is secured to the hub at 166, and the other end of the spring is wound about a negator spring reel 167 rotatable about a central bearing pin 168. The negator spring is prestressed so that it tends, when left to its own devices, to wind itself tightly about the reel 167 and to unwind from the hub. This tendency of the negator spring to unwind from the hub causes a small amount of relatively constant torque to be applied to the reel 161 to maintain the tape 150 under a constant condition of tensioned take-up. When the carriage moves outwardly along the conveyor, the paying out of the tape is accompanied by reverse winding of the negator spring storing energy therein. When the carriage moves in the opposite or return direction, the energy stored in the spring applies clockwise winding torque to the reel 161, and the tape is drawn back into its reservoir.

It is one of the features of the invention that such take-up and display, at the control station, may be used even where the carriage is mounted on a rail which is at the back side of the conveyor. Referring to FIG. 18 the carriage, indicated at 50a, and which carries a stop member 100a, rides on a rail 40a. The tape 150a, which is connected to the carriage in the vertically edgewise position, passes about a flanged idler wheel 156a at the back side of the conveyor and is directed forwardly, with a 90° twist, into the housing 160a corresponding to the housing 160 shown in FIG. 12. An index 158a secured to the housing provides for direct reading of the tape at the control position.

All of the controls for the functions of the dead stop described above are, in accordance with the invention, available to the operator without leaving the control station at the front of the band saw. As shown in FIG. 17 (see also FIG. 1) a small control panel 170 is provided having control valves connected to a pressure line 171 and a sump line 172. In the simplest aspect of the invention, conventional four-way valves may be employed for applying pressure to the associated actuators, either directly or in the reverse sense. Thus in a simplified system a four-way valve 173 is provided connected to lines 65, 66 and having "forward" and "reverse" settings for causing the motor 60 to drive the carriage in the forward and reverse directions. Similarly a four-way valve 174 is used, connected to the clamping actuator 85 via lines 87,88, and movable between "clamping" and "unclamping" positions, to control the clamping of the carriage with respect to the rail upon which it is mounted. Finally, a valve 175 having "up" and "down" positions is connected to lines 127, 128 leading to the actuator sleeve 115 for raising and lowering the stop member 100. In a practical case it would be understood that the simplified fluid circuitry shown in FIG. 17 may be replaced by more sophisticated control elements utilizing, if desired, electrically controlled pilot valves having control switches at the control station for accomplishing the respective functions.

To complete a practical setup, the fluid actuated vise, indicated at 27 in FIG. 1, and controlled from the control console 24, is opened when stock is advanced and closed after the leading end of the length of stock is seated upon, and positioned by, the stop surface 104 in readiness for making the cut.

Any desired means may be used for supporting and guiding the control lines 65, 66, 87, 88 and 127, 128 connected to the movable carriage. One such means is a progressively foldable carrier 176, having a terminal 177, shown in FIG. 1 and which will be recognized by those skilled in this art. Stationary lines are run from the terminal to the control panel.

While the operating sequence and the inherent advantages of the disclosed dead stop assembly will be apparent from the foregoing discussion, it may be helpful to review a typical operating sequence. It may be assumed, for example, that it is desired to cut a length of stock slightly in excess of 20 feet into four 5-foot sections. With the carriage freed, the valve 173 is operated to drive the carriage to a point along the rail where a displacement of exactly 5 feet is indicated at the index 158 for the tape 150. The valve 174 is thrown to the clamping position, pressurizing the line 87 to rock the arm 84 upwardly so that the cam 82 crowds the shoe 81 against the upper edge of the rail, causing the rail to be clamped tightly between the upper and lower arms 51, 52 in the carriage. Although only a single upper shoe 81 is used for clamping purposes, it is found, particularly in view of the impact absorbing characteristics of the assembly, that this is adequate to lock the carriage against any displacement in use.

The conveyor is energized to convey the stock 26 toward the stop member, and when the leading end engages the stop surface 104 the stop member momentarily retreats, with flow of fluid into the accumulator 141, but as soon as the impact has occurred the pressure of the fluid again seats the piston at the reference surface 140 (FIG. 9) for precise positioning of the leading end of the stock. The vise 27 is then closed tight and the saw blade 23 is advanced, cutting off a 5-foot length of stock to form the workpiece. The valve 175 is then thrown to the "up" position. This causes endwise retraction of the stop surface 104 away from the engaged end of the work piece and upward lifting of the stop member 100 to an out-of-the-way position. Operation of the conveyor rollers then causes the work piece to be run forwardly to a position of ejection or unloading, following which the valve 175 is restored to its "-down" setting, thereby lowering the stop member 100 into its obstructing position in readiness for a new cut-off cycle.

While the motor 60 may be directly controlled from the control panel 170 using the four-way valve 173, it is desirable, particularly when frequent changes of the length setting are required, to provide means for automatic positioning of the carriage. A convenient way of accomplishing this is to provide a servo system employing multi-turn potentiometers connected in a bridge circuit, the first being manually settable in accordance with the length of the desired workpiece and the second being coupled to the motor for follow-up to reestablish a condition of circuit balance. Thus referring to FIG. 19, a control circuit is provided having a first multi-turn potentiometer 180 having terminals 181, 182 and a wiper 183. The latter is connected to a manually set scale 184 calibrated directly in units of length and settable at the control station.

Connected across the potentiometer 180 is a second, or follow-up, potentiometer 190 having terminals 191, 192 and a wiper 192, but in this case the wiper has a mechanical connection 194 to the motor 60.

Innerconnecting the wipers is a sensitive polarized relay 200 having alternatively energized contacts 201, 202 with relays 203, 204 imposed in the circuit for energization of forward and reverse terminals 205, 206 of a four-way valve 210. The latter has lines 211, 212 connected to a source of pressure and a sump respectively and connections 213, 214 which are connected to the supply orifices 65, 66 of the motor.

The bridge circuit may be supplied from any suitable source of direct voltage as indicated at B and the relays 203, 204 and valve 210 may be operated from a suitable source via lines L1, L2.

In operation, manual setting of the wiper 183 in accordance with the setting scale 184 unbalances the bridge, thereby energizing the polarized relay which makes contact at 201 or 202 depending upon the direction of the unbalance. Assuming contact is made at 202, the "forward" terminal 205 of the valve 210 is energized, causing the motor 60 to rotate in a direction to drive the carriage forwardly, accompanied by a follow-up movement of the wiper 193 of the second potentiometer. When the carriage has moved the follow-up potentiometer to a point which corresponds to the setting of the scale 184, the bridge achieves the balanced condition, the carriage stops, and may then be clamped in place.

It will be apparent that a more elaborate self-positioning scheme of the analog type may be employed using selysns, or, if desired, a high degree of positioning accuracy may be obtained using digital techniques. In the latter event manual means may be employed for establishing a number of digits corresponding to a desired cut-off length and a digital feed back arrangement, coupled to the motor or carriage may be used for energizing the motor until a condition of digital coincidence is achieved, following which the motor is automatically de-energized with the carriage in the set position.

The above discussion has been directed toward a preferred automatic and fully powered embodiment of the invention, but it will be understood that certain of the inventive features may be used with only manual powering. For example, the clamp structure disclosed in FIG. 6 may be modified by extending the arm 84, connected to the cam 82, so that it terminates in a gripping handle to take the place of the actuator 85 to which the arm is normally coupled. Moreover, if desired, the driving motor 60 (see FIG. 4) may be omitted and the carriage may be propelled along the rail simply by manual pushing. In such event, however, the calibrated tape which extends along the rail 40 would be fixed and an index would be provided on the carriage so that the setting of the stop is directly and constantly indicated to the operator right at the carriage position. The rocking movement of the stop may also, if desired, be accomplished manually by providing a rigid, radially extending arm on the shaft 110, by providing biasing means, for example, in a form of a stiff spring in the space 123 of the sleeve to maintain the stop surfaces 140 in normal, bottomed condition, and by angling the initial portion 131 of the cam track at a convenient steep angle and by shortening the cam track to provide free upward swing after only minor endwise movement.

As used herein, the term "extending the width of the conveyor," referring to the stop surface, has to do with the fact that the stop surface extends along the width dimension of the conveyor, the length of the stop surface being such as to insure stricking by the workpiece.

I claim as my invention:

1. In a dead stop length gage for defining the cut-off length of a workpiece from a length of stock in a band saw or the like, the combination comprising a conveyor extending downstream from the band saw, a rail mounted longitudinally along one side of the conveyor, a carriage riding on the rail, means for positioning the carriage and for clamping the carriage to the rail at a selected position, a stop member on the carriage having a stop surface extending the width of the conveyor, a shaft extending parallel to the rail for mounting the stop member, a sleeve mounted on the carriage and telescoped over the shaft so that the shaft is both axially and rotationally movable in the sleeve, the sleeve being recessed to form an annular fluid chamber having alternatively pressurized inlets at its ends and the shaft having an integral piston movable in the chamber for moving the shaft between a reference position in which the stop surface on the arm is positioned to engage the oncoming stock and a retracted position, the sleeve having an internal cam track and the shaft having a cam follower, with the cam track being so arranged that upon retracting movement of the shaft the stock member is both retracted from the engaged end of the severed workpiece and swung upwardly out of the way of the workpiece for continued movement of the workpiece along the conveyor.

2. The combination as claimed in claim 1 in which the remote one of the pressurized inlets has a fluid accumulator and in which the cam track has an initial axially extending portion to permit retreating movement of the stop member straight back from reference position, with subsequent restoration to the reference position, upon impact of the stop surface by an oncoming length of stock.

3. In a dead stop length gage for defining the cut-off length of a workpiece from a length of stock in a band saw or the like, the combination comprising a conveyor extending downstream from the band saw, a rail mounted longitudinally along one side of the conveyor, a carriage riding on the rail, means for driving the carriage along the rail and for clamping the carriage to the rail at a selected position, a stop member in the form of an arm having a stock-engaging surface extending the width of the conveyor, means including a telescoped shaft and sleeve having an axis parallel to the rail for supporting the stop member for swinging movement as well as for limited axial retracting movement, an axial position reference stop interposed between the stop member and carriage for defining the working position of the stop member, fluid actuator means interposed between the stop member and carriage for pressing the stop member into bottoming engagement with the reference stop during the gaging of the work piece and for retracting the stop member axially away from the severed workpiece, and a cam and cam follower interposed between the shaft and the sleeve and so formed that upon retraction the stop member is retracted from the severed workpiece and swung upwardly out of the way of the workpiece for continued movement of the latter.

4. In a dead stop length gage for defining the cut-off length of a workpiece from a length of stock in a band saw or the like, the combination comprising a conveyor extending downstream from the band saw, a rail mounted longitudinally along one side of the conveyor, a carriage riding on the rail, power means for moving the carriage along the rail, means for clamping the carriage to the rail at a selected position, a stop member on the carriage in the form of an arm presenting a stop surface across the width of the conveyor, a hinge connection between the stop member and the carriage extending along an axis parallel to the rail and permitting limited retracting movement of the stop member along the axis as well as upward swinging movement, an axial position reference stop between the carriage and stop member, a cam and cam follower interposed between the carriage and stop member, a reversible fluid actuator interposed between the carriage and stop member having means for applying fluid pressure in one direction for normally maintaining the stop member seated against the reference stop for positioning the workpiece, said cam having a straight axial portion and an angled portion so that when the direction of pressure in the fluid actuator is reversed the stop member retracts away from the engaged end of the severed workpiece followed by upward swinging movement of the stop member out of the way of the workpiece for continued movement of the workpiece along the conveyor.

5. In a dead stop length gage for defining the cut-off length of a workpiece from a length of stock in a band saw or the like, the combination comprising a conveyor extending downstream from the band saw, a rail mounted longitudinally along one side of the conveyor and having a rack thereon, a carriage riding on the rail, the carriage having a self contained motor and drive pinion for engaging the rack, means for positively clamping the carriage to the rail at a selected position, a stop member on the carriage arranged to extend across the width of the conveyor and hinged to the carriage about an axis parallel to the rail to permit upward swinging movement as well as limited retracting movement in the direction of the axis, and axial position reference stop interposed between the carriage and stop member, a cam and cam follower interposed between the carriage and the stop member, fluid actuator means interposed between the carriage and stop member for normally maintaining the stop member bottomed on the positioning stop and having provision for reversal of pressure, the cam and cam follower upon reversal of pressure being so formed as to cause the stop member to retract from the engaged end of the severed workpiece and to swing upwardly out of the way of the workpiece for continued movement of the work along the conveyor.

6. In a dead stop length gage for defining the cut off length of a workpiece from a length of stock in a band saw or the like, the combination comprising a conveyor extending downstream from the band saw, a rail mounted longitudinally along one side of the conveyor, a carriage riding on the rail, means for moving the carriage along the rail and for positively clamping it to the rail at a selected position, a stop member in the form of an arm having a stop surface extending across the width of the conveyor and having a mounting shaft extending axially parallel to the rail, a sleeve mounted on the carriage and telescoped over the shaft so that the shaft may both rotate and move in an axial direction with respect to the sleeve, the sleeve having at each of its ends a fluid seal with respect to the shaft and defining an annular chamber, a piston integral with the shaft for endwise movement in the chamber, an annular insert filling the chamber at one end of the sleeve so that the piston is limited to movement between a reference position and a retracted position, the insert having a cam track formed therein and the shaft having a cam follower riding in the track, the cam track being so formed that when the piston is pressurized for retracting movement the cam follower retracts the stop member and swings it upwardly away from the engaged end of the severed workpiece for continued travel of the workpiece along the conveyor.

7. In a dead stop length gage for defining the cut-off length of a workpiece from a length of stock in a band saw or the like, the combination comprising a conveyor extending downstream from the band saw, a rail mounted longitudinally along one side of the conveyor, the rail being arranged vertically edgewise to present parallel upper and lower edges, a carriage having a frame consisting of a pair of vertical, spaced apart end members arranged in parallel relation including a central portion of C-shaped cross section extending between them and having upper and lower arms defining a central space which extends all the way through the frame, the rail being accommodated in such space with its upper and lower edges adjacent the upper and lower arms, anti-friction means associated with the upper arm for slidingly mounting the carriage with clearance between the rail and the lower arm, clamping means in the carriage (associated with) including a cam mounted upon the upper arm for applying clamping pressure to the upper edge of the rail thereby bodily lifting the carriage to produce clamping engagement between the lower arm and the lower edge of the rail, a stop member hinged to the carriage having a stop surface extending across the width of the conveyor in obstructing relation to an oncoming length of stock, and means including an hydraulic actuator for retracting the stop from the end of a severed workpiece and for swinging it clear of the workpiece for transport of the workpiece by the conveyor to a position of discharge.

8. In a dead stop length gage for defining the cut-off length of a workpiece from a length of stock in a band saw or the like, the combination comprising a conveyor extending downstream from the band saw, a rail mounted longitudinally along one side of the conveyor, the rail being arranged vertically edgewise to present parallel upper and lower edges, a carriage having a frame of C shape including upper and lower arms embracing the rail, anti-friction means on the carriage frame for engaging the upper edge and the sides of the rail while providing a limited amount of clearance between the lower edge of the rail and the lower arm of the frame, a shoe captive in the upper arm and extending through an opening therein from a point opposite the upper edge of the rail to a point above the upper arm, a cam mounted in the carriage frame above the upper arm thereof and having means for rocking the cam to cause downward crowding against the presented upper surface of the shoe for relative lifting of the frame to take up the clearance and for clamping of the lower arm against the lower edge of the rail, a stop member on the carriage having a stop surface extending across the width of the conveyor in obstructing relation to an oncoming length of stock, the stop member being hinged about an axis parallel to the rail and having means for imparting rocking movement for rocking the stop member out of obstructing position for passage of the workpiece along the conveyor.

* * * * *